United States Patent [19]

van der Lely

[11] Patent Number: 4,552,223
[45] Date of Patent: Nov. 12, 1985

[54] SOIL CULTIVATING IMPLEMENTS

[76] Inventor: Cornelis van der Lely, 7 Brüschenrain, Zug, Switzerland

[21] Appl. No.: 497,552

[22] Filed: May 24, 1983

[30] Foreign Application Priority Data

May 26, 1982 [NL] Netherlands ............... 8202143

[51] Int. Cl.⁴ ............................... A01B 33/06
[52] U.S. Cl. ..................... 172/49.5; 172/713
[58] Field of Search ............... 172/49.5, 49, 59, 111, 172/713, 744, 522, 526

[56] References Cited

U.S. PATENT DOCUMENTS

| 75,310 | 3/1868 | Standish | 172/49.5 |
|---|---|---|---|
| 217,320 | 7/1879 | Beauregard . | |
| 377,980 | 2/1888 | Bateman | 172/713 X |
| 669,258 | 3/1901 | Lanz | 172/713 |
| 1,041,980 | 10/1912 | Dremel | 172/59 |
| 2,741,173 | 4/1956 | White | 172/59 |
| 3,765,491 | 10/1973 | Lely . | |
| 3,783,948 | 1/1974 | Lely | 172/49.5 |
| 4,050,520 | 9/1977 | Lely | 172/49.5 |
| 4,053,020 | 10/1977 | Lely | 172/713 |
| 4,058,171 | 11/1977 | Lely | 172/713 |
| 4,106,567 | 8/1978 | Lely | 172/713 |
| 4,470,467 | 9/1984 | Barato | 172/713 |

FOREIGN PATENT DOCUMENTS

| 2356348 | 1/1978 | France | 172/49.5 |
|---|---|---|---|
| 2492 | of 1901 | United Kingdom | 172/744 |
| 1373591 | 11/1974 | United Kingdom . | |
| 1386454 | 3/1975 | United Kingdom . | |
| 1547718 | 6/1979 | United Kingdom . | |
| 2035026 | 6/1980 | United Kingdom | 172/49.5 |

OTHER PUBLICATIONS

Implement and Tractor p. 25, May 7, 1970.

Primary Examiner—Richard J. Johnson
Attorney, Agent, or Firm—Penrose Lucas Albright

[57] ABSTRACT

A soil cultivating implement comprises a hollow portion which rotatably supports a row of substantially vertical shafts, each shaft carrying a corresponding soil working member at its lower end. Each soil working member comprises a tine holder having two laterally extending limbs which are both curved rearwardly with respect to the intended direction of operative rotation thereof and define shallow U-shaped channels, the outer end of each limb being integrally provided with a corresponding tine carrying sleeve in which is snuggly and slidably received a relatively rigid tine composed of spring-type steel. The tines are formed from rod material of uniform square cross section and each of them has, at a radially innermost corner, a notch which can be brought into register with any one of four spaced bores in the carrying sleeve, a retaining member, a pin tube, on the like being entered through a selected bore and the corresponding notch to retain the tine in the desired position of downward projection from the sleeve. With the tines becoming shorter due to wear, their original effective lengths can be restored by displacing them downwardly in the sleeves. This permits the maximum working depth of the implement to be attained without having to replace the tines when they become initially worn. Alternative embodiments are described in which the tines constitute strip-shaped bars of elongated rectangular cross section, each of which has a plurality of notches or holes for cooperation with a single bore and a retaining pin, tube or the like.

10 Claims, 10 Drawing Figures

SOIL CULTIVATING IMPLEMENTS

SUMMARY OF THE INVENTION

This invention relates to soil cultivating implements or machines, such as rotary harrows, of the kind which comprise a frame portion movable over the ground and a plurality of power-drivable soil working members that are rotatable about upwardly extending axes, each such member including a holder which carries at least one tine or other soil working tool in a sleeve of that holder. "Implements or machine" are referred to as "implement" alone throughout the remainder of this document for the sake of brevity.

Known implements of the kind set forth suffer from the disadvantage that their tines or other soil working tools need replacement after only a short life because wear soon shortens them to such an extent that, otherwise, the maximum and close to maximum working depths of the implement can no longer be employed. It is an object of the invention to overcome or very greatly reduce this disadvantage in such a way that compensation for the wear can be made without reducing the reliable support of the tines or other soil working tools. Accordingly, one aspect of the invention provides a soil working implement of the kind set forth, wherein each of said sleeves has a length which is not less than substantially one-third of the length of a new (unworn) tine or other soil working tool that is received therein, means being provided by which each tine or other tool can be retained in any one of at least two different positions of projection from the corresponding sleeve.

For a better understanding of the invention, and to show how the same may be carried into effect, reference will now be made, by way of example, to the accompanying drawings, in which:

DESCRIPTION OF THE PREFERRED EMBODIMENTS

Figure 1:
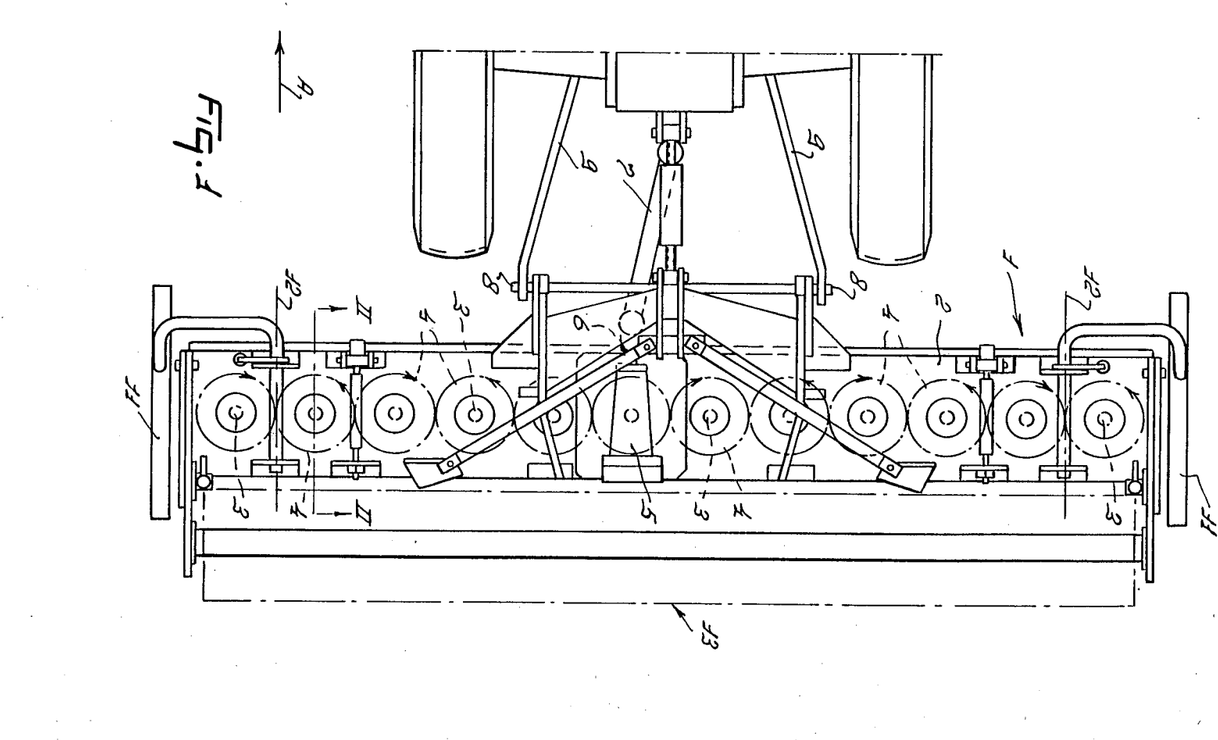
FIG. 1 is a plan view of a soil cultivating implement in accordance with the invention shown connected to the rear of an agricultural tractor.

Referring firstly to FIGS. 1 to 5 of the accompanying drawings, the soil cultivating implement 1 that is illustrated in its entirety in FIG. 1 is in the nature of a rotary harrow intended primarily, but not exclusively, for the preparation of seed beds. The implement 1 comprises a hollow box-section frame portion 2 that extends substantially horizontally transverse and usually, as illustrated, substantially horizontally perpendicular, to the intended direction of operative travel of the implement 1 that is indicated in FIG. 1 by an arrow A. The hollow box-section frame portion 2 rotatably supports a plurality (in this case, twelve) of rotary soil working members 3A (FIG. 2) that are arranged in a single row that extends parallel to the transverse length of the frame portion 2 immediately beneath that frame portion. Each soil working member 3A is mounted at the lowermost end of a corresponding shaft 3 that will usually, as illustrated, be vertically or substantially vertically disposed but that could, under some operating circumstances, be inclined at a significant angle to the vertical. The twelve, in this embodiment, shafts 3 define the axes of rotation of the corresponding soil working members 3A and those axes of rotation, which coincide with the longitudinal axes of the shafts 3 themselves, are conveniently spaced apart from one another at regular intervals of substantially twenty-five centimeters so that the implement which is being described has a total working width of substantially, although not necessarily exactly, three meters.

A splined portion of each shaft 3 that is located internally of the hollow frame portion 2 receives the matchingly splined hub of a corresponding straight-toothed or spur-toothed pinion 4, each pinion 4 having its teeth in mesh with those of the immediately neighboring pinion 4 in the row of twelve such pinions. The opposite ends of the frame portion 2 are closed by substantially vertical side plates that extend substantially parallel to one another and to the direction A. One of the center pair of rotary shafts 3 is extended upwardly through the top of the hollow frame portion 2 into a gearbox 5 that is mounted above the frame portion 2. The gearbox 5 comprises shafts and pinions (not shown) that place the extended shaft 3 in driven connection with a rotary input shaft 6 of said gearbox that projects forwardly from the front of that gearbox in substantially the direction A, the shaft 6 being splined or otherwise keyed for driven co-operation with a telescopic transmission shaft 7 which is of a construction that is known per se having universal joints at its opposite ends, the leading end of the transmission shaft 7 being connected to the rear power take-off shaft of an agricultural tractor or other operating vehicle of the implement in the manner that is shown somewhat diagrammatically in FIG. 1. The rear of the gearbox 5, with respect to the direction A, is provided with a change-speed gear which will not be described in detail since it is not the subject of this invention. However, briefly, it can be manually adjusted, as may be required, to give the rotary soil working members 3A a selected one of a number of faster or slower speeds of revolution without having to vary the driving speed applied to the rotary input shaft 6. The selected speed of operation depends upon the nature and condition of the soil that is to be cultivated by the implement and the particular purpose for which that soil is required after cultivation.

The top and front of the hollow frame portion 2, with respect to the direction A, carry a coupling member or trestle that may be of a construction which is known per se and that is of substantially triangular configuration as seen in front or rear elevation. This coupling member or trestle comprises lower coupling points 8 for pivotal connection to the rear ends of corresponding lower lifting links 9 of a three-point lifting device or hitch carried at the back of the operating agricultural tractor or other vehicle, said lifting device or hitch also comprising a single upper lifting link of adjustable length that is connected to the apex of the coupling member or trestle in the known manner that is shown somewhat diagrammatically in FIG. 1.

A shield plate 11 is arranged immediately beyond each opposite end of the single row of rotary soil working members 3A, each shield plate 11 normally extending substantially vertically parallel to the direction A with its lowermost edge contacting the ground surface so as to be slidable over that surface in the direction A. Each shield plate 11 is carried by a corresponding arm that has a portion which is turnably mounted, in brackets carried on top of the hollow frame portion 2, so as to be turnable about a corresponding axis 12 that extends substantially horizontally parallel to the direction A. The two axes 12 are spaced inwardly towards the center of the frame portion 2 from the ends of that frame portion 2 so that the two shield plates 11 can bear on the ground surface with some pressure and can move upwardly and downwardly, as may be required, about the corresponding axes 12 to match undulations in the surface of the ground during operative travel in the direction A. The shield plates 11 serve the primary purpose of co-operating with the neighboring soil working members 3A at the opposite ends of the single row thereof in working the soil to substantially the same thorough extent as is produced by co-operation between pairs of the soil working members 3A at locations closer to the center of the implement. However, the shield plates 11 also prevent any injury or damage from being caused by stones or other hard objects that might otherwise be flung laterally of the implement by the rapidly rotating soil working members 3A.

A freely rotatable ground roller 13 is mounted immediately behind the soil working members 3A with respect to the direction A, the opposite ends of said roller 13 being rotatably carried by corresponding arms that are connected to the ends of the hollow frame portion 2 so as to be turnable upwardly and downwardly relative to that frame portion, the arms being provided with means to retain them in chosen angular settings about a substantially horizontal axis relative to the frame portion 2. The ground roller 13 which is not illustrated in detail is preferably an open-work cage formation roller and it is this roller 13 that principally supports the implement from the ground surface when it is in operation. Accordingly, the angular setting of the arms which carry the roller 13 relative to the frame portion 2 is the primary factor that determines the maximum depth of penetration of the soil working members 3A into the ground which is possible during a cultivating operation.

Figures 2, 3, 4:
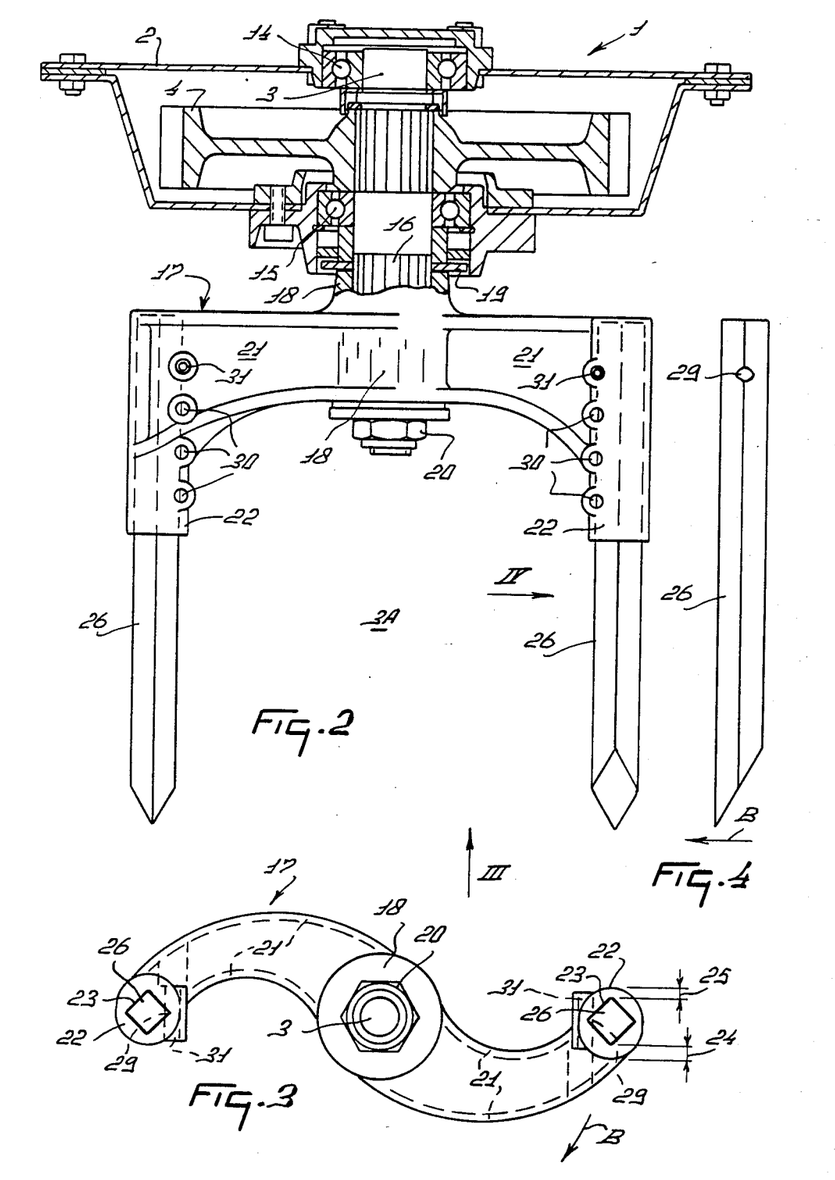
FIG. 2 is a partial sectional elevation, to an enlarged scale, the section being taken on the line II—II in FIG. 1.
FIG. 3 is a bottom view of a tine holder of the invention as seen in the direction indicated by an arrow III in FIG. 2.
FIG. 4 is a side view of a single unmounted tine as seen in the direction indicated by an arrow IV in FIG. 2.

FIG. 2 of the drawings shows the hollow frame portion 2 in cross-section and one of the rotary soil workings members 3A in side elevation. It will be seen from this Figure that each shaft 3 is rotatably journalled both in an upper ball-bearing 14 carried by the top of the frame portion 2 and in a lower ball-bearing 15 carried by the bottom thereof. Each shaft 3 is provided, beneath the corresponding lower bearings 15, with axially extending splines 16 which splines cooperate with splines (not visible) formed internally of the hub 18 of a tine holder 17 of the soil working member 3A concerned. The lowermost extremity of each shaft 3 has a projecting screw-threaded stub of reduced diameter which stub receives a washer and a vibration-proof nut 20 that clamps the hub 18 firmly and releasably between said washer and a further washer or supporting ring 19 that rotates with the shaft 3 and is effectively rigid with the inner race of the lower ball-bearing 15.

It can be seen from FIG. 2 of the drawings that the tine holder 17 of each soil working member 3A extends away from the hub 18 thereof in two opposite directions but reference to FIG. 3 will show that each limb of the tine holder 17 is curved in such a way that the convex side of the curve is foremost with respect to the intended direction of operative rotation B (FIG. 3) of the soil working member 3A concerned. Thus, as seen in FIG. 3 or in plan view, each tine holder 17 is of shallow S-shaped configuration. The curve of each limb of the tine holder 17 is continuous towards the outermost end thereof where a corresponding soil working tool in the form of a tine 26 is mounted. The curvature of each limb of the tine holder 17 is, in fact, such that, as seen in FIG. 3, a tangent to that limb taken alongside the hub 18 will be at an angle of between 45° and 90° to a second tangent taken alongside the mounting of the corresponding tine 26, it being preferred that each limb should be so shaped that the angle between these tangents is substantially 70°. As will be apparent from FIG. 3 of the drawings, the two limbs of each tine holder 17 extend outwardly in an identical manner from the hub 18. The rearward curvature of each limb of each tine holder 17, relative to the direction of rotation B of the corresponding soil working member 3A, enables soil displaced by that member 3A to move more readily along the limbs of the tine holder 17 in a direction opposite to the direction B. This reduces the power necessary to operate each member 3A and thus saves fuel and it has been found that it counteracts the tendency for excavated soil to move upwardly so that the amount of displaced soil which moves between the top of each soil working member 3A and the bottom of the hollow frame portion 2 is reduced as compared with implements not possessing this feature. Each curved limb of each tine holder 17 may advantageously be made from cast steel and may have a U-shaped or H-shaped cross-section when seen in a direction parallel to the longitudinal axis of the corresponding shaft 3, the leading substantially vertically disposed but convexly curved side of each limb being formed with a shallow cavity 21 that will tend to guide displaced soil outwardly towards the end of the limb at which the corresponding tine 26 is mounted. This feature also tends to reduce the amount of displaced soil which moves over the top of each tine holder 17. A similar cavity 21 is formed at the rear substantially vertically disposed but concave side of each limb of each tine holder 17. It will be seen in FIG. 3 of the drawings that each limb of each tine holder 17 progressively decreases in width from the hub 18 thereof to the outer ends of the limbs at which the tines 26 are mounted.

The outermost end of each limb of each tine holder 17 is provided with a corresponding carrying sleeve 22 that is integral with the remainder of the holder 17. The lowermost end of each sleeve 22 is substantially horizontally perpendicular to the longitudinal axis of the corresponding shaft 3 and is located, considered lengthwise of that axis, at a significant distance beneath the bottom of the hub 18, said distance advantageously being substantially equal to the axial length of that hub 18. The distance by which the lower ends of the sleeves 22 are beneath the lower end of the hub 18 is substantially forty percent of the vertical height of each tine holder 17 measured alongside one of the sleeves 22. It can be seen in FIG. 2 of the drawings that the lower surface of each tine holder 17 is curved outwardly and downwardly from the bottom of the hub 18 to merge into the material of the two sleeves 22 at some distance above the lower ends of those sleeves.

Each carrying sleeve 22 is formed, in this embodiment, with an axially extending bore 23, the cross-section of which is of uniform size and shape throughout its length, each bore 23 being of square cross-section in the embodiment of FIGS. 1 to 5 of the drawings. Each bore 23 is so disposed relative to the direction of rotation B of the corresponding soil working member 3A that one diagonal of its cross-section is tangential to an imaginary circle centered upon the axis of rotation of the shaft 3 concerned whereas the other diagonal is substantially radially disposed relative to that axis. However, the bores 23 are not centrally located in the sleeves 22 but are eccentrically located in those sleeves so that the distance 24 (FIG. 3) between the front (with respect to the direction B) of each sleeve 22 and the leading point of the square cross-section of the corresponding bore 23 is greater than is the distance 25 between the rearmost extremity of each sleeve 22 and the rearmost point of the square cross-section of the corresponding bore 23, the exterior of each sleeve 22 being somewhat oval, rather than truly circular, as also can be seen in FIG. 3 of the drawings. The thickest material of each sleeve 22 (corresponding to the distance 24—FIG. 3) is at the front of that sleeve 22 with respect to the intended direction of operative rotation B of the corresponding soil working member 3A and, consequently, the highest rate of abrasive wear that takes place at the front of each sleeve 22 does not cause serious weakening of the sleeve until a much longer period of time has elapsed than would be the case if each bore 23 were to be disposed truly centrally of the corresponding sleeve 22. The rear of each sleeve 22, with respect to the direction B, receives very little abrasive wear and a material thickness corresponding to the distance 25 is thus sufficient in this region. It will be appreciated that the construction which has just been described makes substantially optimum use of the material of each carrying sleeve 22.

Figures 5, 6, 7:
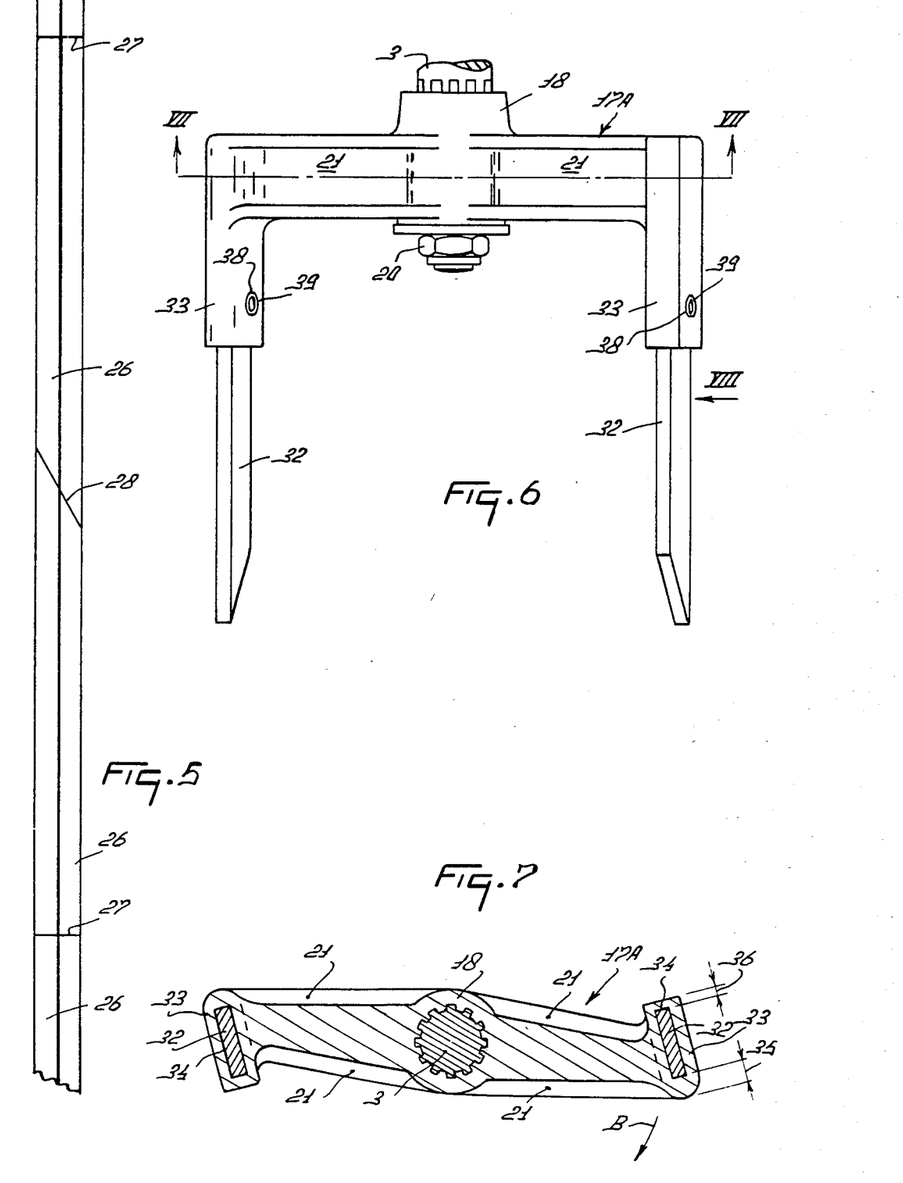
FIG. 5 is a side elevation illustrating the way in which tines of the kind shown in FIG. 4 can be formed from lengths of rod.
FIG. 6 is a side elevation similar to the lower unsectioned portion of FIG. 2 which illustrates an alternative construction.
FIG. 7 is a section taken on the line VII—VII in FIG. 6.

Each tine 26 is, in this embodiment, of square cross-section and is a snug but freely slidable fit in the corresponding bore 23. As will become apparent below, each tine 26 can be moved downwardly from one position to another to compensate for wear which takes place on the portions of the two tines 26 of each member 3A that project downwardly from the lower ends of the sleeves 22. The upper end of a new tine 26 substantially coincides with the upper surface of the corresponding tine holder 17 as shown in FIG. 2 of the drawings and, with such a new tine, not less than substantially one-third of the length thereof is received in the corresponding bore 23, the remainder of that tine projecting downwardly beyond the lowermost end of that bore. Each tine 26 is thus supported in a stable manner along a significant portion of its length even when it has been displaced downwardly, as will be described below, in its carrying sleeve 22 after it has become worn to a predetermined extent. Each tine 26 is made from a length of rod of square cross-section measuring, in the embodiment which is being described, eighteen millimeters, by eighteen millimeters. The material of the rod is preferably a wear-resistant, hard spring steel and FIG. 5 of the drawings illustrates how the tines 26 are produced from a length of the rod material. A cut 27 extending perpendicular to the longitudinal axis of the rod is made through that rod and, at a distance from the cut 27 corresponding to the length of the tine 26 that is required, a further oblique cut 28 is made, the oblique cut 28 being inclined at 30° to the longitudinal axis of the rod material as seen in FIG. 5 but it being possible for said inclination to be as little as 20° or as great as 50° although the 30° inclination is preferred. It can also be seen in FIG. 5 that the oblique cut 28 extends between two diagonally opposite corners of the square cross-section rod material and that, at a further distance along that material from the diagonal cut 28 which is equal to the distance between the perpendicular cut 27 and said oblique cut 28, a second perpendicular cut 27 is made and it will be apparent that, in this way, two identical tines 26 are formed between successive perpendicular cuts 27 without any wastage of the rod material, it only being necessary to repeat the sequence which has just been described to produce further tines 26 from the rod material.

FIG. 4 of the drawings illustrates a single tine 26 together with the intended direction of operative rotation B of the soil working member 3A in which that tine 26 will be used. It can be seen that the sharp point at the lowermost extremity of the tine 26 is foremost with respect to the direction B and also that, at a location which is substantially twelve percent of the total length of the unworn tine 26 from its uppermost end (which corresponds to one of the perpendicular cuts 27 shown in FIG. 5), a removed portion constituting a gap or notch 29 is formed at that corner of the square cross-section of the tine 26 which will be radially innermost when the tine 26 is operatively mounted in its carrying sleeve 22 as shown in FIGS. 2 and 3. The notch 29 in each tine 26 is symmetrically disposed with respect to said corner of that tine and is of substantially semi-circular shape, coinciding with an imaginary circular cylindrical surface having a longitudinal axis which is perpendicular to, and spaced from, the longitudinal axis of the tine 26 itself. The longitudinal axis of the imaginary cylinder extends substantially tangentially with respect to an imaginary circle defining a 360° rotation in the direction B and is, of course, located at that side of the tine 26 which is closest to the longitudinal axis of the corresponding shaft 3 when the tine 26 concerned is mounted in its carrying sleeve 22. Although the shape of each notch 29 that has just been described is preferred, it is by no means essential and the surface of said notch may, if desired, form part of an imaginary conical or pyramidal surface under which circumstances the surface of the notch 29 itself will taper in one direction.

Each sleeve 22 is formed with a row, such as four, of circular cross-section bores 30 having longitudinal axes which are parallel to one another, perpendicular to the longitudinal axis of the corresponding shaft 3, and contained in a substantially vertical plane that is parallel or substantially parallel to the last-mentioned axis. Each row of bores 30 is located at that side of the corresponding sleeve 22 which is closest to the corresponding shaft 3 and, in the embodiment that is being described, each row comprises four bores 30 that are vertically spaced apart from one another at regular intervals. The diameter of each bore 30 is equal to that of the above-mentioned imaginary circular cylindrical surface part of which coincides with the surface of the notch 29 or will be shaped to match the surface of that notch 29 if some other shape thereof is chosen.

An elongated retainer member such as a pin or tube 31 is received in a selected bore 30 to cooperate with notch 29 to secure tine 26 at the desired position of projection from sleeve 22.

In this embodiment, each rotary soil working member 3A comprises one of the tine holders 17 and two of the tines 26, those tines being disposed at diametrically opposite sides of the longitudinal axis of the shaft 3 to which said member 3A is firmly but releasably secured. It is, however, not essential that each soil working member 3A should have two tines 26 and it may comprise only a single tine 26 or more than two thereof. Moreover, the manner of mounting the tines in each soil working member may be that which will be described below in connection with the embodiment of FIGS. 6 to 10 of the drawings rather than that which is being described in relation to FIGS. 1 to 5 of the drawings.

The known telescopic transmission shaft 7 drivingly interconnects the rear power take-off shaft of the agricultural tractor or other operating vehicle of the implement and the rotary input shaft 6 of the gearbox of that implement. The drive from the input shaft 6 is transmitted via the gearbox 5 and its rear-mounted change-speed gear to the upward extension of said one of the twelve shafts 3 and this shaft 3, in turn, transmits drive through the intermeshing pinions 4 to all the other eleven shafts 3. With this arrangement, each pinion 4, shaft 3 and soil working member 3A rotate in the opposite direction to the immediately neighboring similar assembly as indicated by arrows in FIG. 1 of the drawings, these arrows corresponding to the arrows B in FIGS. 2 and 3 thereof. When, as mentioned above, the longitudinal axes (axes of rotation) of the shafts 3 are spaced apart from one another at intervals of substantially twenty-five centimeters, each member 3A has a working width which is a little greater than substantially twenty-five centimeters and the result is that the strips of soil which are cultivated by the individual members 3A overlap one another to produce a single broad strip of worked soil having, as discussed above, a width of substantially three meters in the case of the example that is being described. The soil working members 3A are, of course, staggered in position around the shafts 3 so that they do not foul one another during rotation, the implement producing a very intensive cultivating action in which soil is displaced between each neighboring pair of shafts 3 by the tines 26 of the oppositely rotating members 3A that correspond to those shafts 3. The members 3A at the opposite ends of the single row of twelve such members also co-operate with the neighboring shield plates 11 in cultivating the soil as briefly discussed above.

The rapid power-driven rotation of the tines 26 through abrasive soil inevitably causes the tines 26 to become worn and such wear is particularly marked where the soil moves over the free ends of the tines, the wear at these points generally causing blunting and rounding of the tine ends together with progressive shortening of the tines. When the tines 26 have become shortened, it is no longer possible for the implement to be set to operate at its maximum working depth by appropriate bodily upward adjustment of the ground roller 13 and it is necessary to displace the tines 26 in their carrying sleeves 22 in order to re-establish the facility of being able to adopt the maximum soil working depth of the implement. In known implements, it was necessary to replace all of the tines or other soil working tools to re-establish this facility but, in the implement that is being described, each tine 26 can be moved downwardly in its carrying sleeve 22 to restore its full effective length without having to replace it. The number of times which this can be done is one less than the number of bores 30 that is provided. Each tine holder 17 is, of course, also subject to some abrasive wear but this is much less rapid than the wear upon the tines 26 since the tine holders 17 move over broken soil whereas the tines 26 themselves move through unbroken soil. To enable each tine 26 to be retained in the initial position in which its upper end is at substantially the same level as the upper end of the corresponding sleeve 22 and the top (excluding its hub 18) of the corresponding tine holder 17, a circular cylindrical or tapering pin or tube 31 is provided for each sleeve 22 and can be inserted through the uppermost bore 30 when the notch 29 of the tine 26 concerned is disposed in register with that bore 30. The pin or tube 31 intrudes into the notch 29 and prevents upward or downward movement of the tine 26 in the sleeve 22. When eventual wear has significantly shortened one of the tines 26, its full downwardly projecting length can be restored by temporarily removing the corresponding pin or tube 31, moving the tine 26 downwardly in the sleeve 22 until its notch 29 comes into register with the next bore 30 below the uppermost one, and finally replacing the pin or tube 31 in this second bore 30 to re-secure the tine 26 in its fresh position in the sleeve 22 which fresh position substantially, if not exactly, restores the original downwardly projecting length of the tine 26 when it was new. It will be readily apparent that the same operation can be undertaken twice more for each tine 26 causing the pin or tube 31 to co-operate with the notch 29 and the third and fourth bores 30, counting downwardly from the uppermost one, the full downwardly projecting length of the tine 26 being restored each time. Eventually, of course, the tine 26 will require replacement but after a very greatly extended working life as compared with constructions where replacement is necessary, to restore the facility of cultivating at the maximum working depth of the implement, as soon as the tine has first become so shortened by wear as to prevent the maximum working depth being employed. The effective use of the tine material is very significantly improved in this way.

A still further increase in the effective life of each tine 26 can be attained by increasing the length of the new tines 26 in such a way that their upper ends project above the tops of the sleeves 22 into the space between the bottom of the hollow frame portion 2 and the tops of the tine holders 17, the lower ends of the tines 26 initially still projecting downwardly from the sleeves 22 by the required extent to enable the maximum working depth of the implement to be employed. It is noted that, since the projecting upper ends of the tines 26 will only move through a little well broken soil under these circumstances, the amount of wear to which they will be subject will not be significant. The curved lower surface of each tine holder 17 combines with the provision of the cavities 21 in tending very considerably to minimize the amount of broken soil that moves over the top of each tine holder 17. It is noted that, if the new tines are to project above the upper ends of the sleeves 22 by a significant distance, it is necessary to provide a second notch 29 in each tine 26 at a lower level than the notch 29 which can be seen in FIG. 4. This second notch 29 will initially cooperate with the uppermost bore 30 and either notch 29 can subsequently be used when a downward displacement of the worn tine 26 becomes necessary, the illustrated uppermost notch 29 finally being employed in co-operation with the lowermost bore 30 at the final adjustment before eventual replacement is required.

Not less than substantially one-third of the total length of a new tine 26 is surroundingly supported by the corresponding carrying sleeve 22 when said tine 26 is inserted in that sleeve 22 with its uppermost end flush, or substantially flush, with the upper end of the sleeve 22 itself and, accordingly, an entirely adequate support of the tine 26 is ensured throughout its working life, even when the notch 29 and pin or tube 31 cooperate with the lowermost bore 30 corresponding to the sleeve 22 concerned. It is noted that the portion of each carrying sleeve 22 that extends, as seen in FIG. 2, downwardly beyond the curved bottom of the tine holder 17 that interconnects the hub 18 and the sleeve 22 under consideration may be considered as constituting an element which participates in the cultivation of the soil since this lower portion of each carrying sleeve 22 is substantially cylindrical and, as previously discussed, has an oval or elliptical cross-sectional shape. The major axis of the oval or ellipse extends, as can be seen in FIG. 3, tangentially with respect to an imaginary circle centered upon the longitudinal axis of the corresponding shaft 3.

In the embodiment that has so far been described, each tine 26 extends substantially parallel to the corresponding shaft 3 but this is not essential and, if preferred, the carrying sleeves 22 of each member 3A may be connected to the tine holder 17 thereof so as to be inclined rearwardly from top to bottom with respect to the intended direction of rotation B of that soil working member 3A. Under these circumstances, the tines 26 that are received in the sleeves 22 will, naturally, also trail rearwardly in a similar manner.

FIGS. 6 to 10 of the drawings illustrate an alternative construction of parts of the soil cultivating implement of FIG. 1 but parts which, in FIGS. 6 to 10, are similar or identical to parts that have already been described will be indicated by the same reference numerals as are shown in FIGS. 1 to 5 of the drawings and will not be described in detail again. As can be seen in FIG. 6 of the drawings, each rotary soil working member of this embodiment comprises a tine holder 17A which extends substantially rectilinearly in two diametrically opposite directions from an integral and central hub 18, the two limbs of the holder 17A again being formed at the leading and trailing, with respect to the intended direction of operative rotation B, substantially vertical sides thereof with cavities 21 which serve the same purpose as described above for the first embodiment. The two limbs of each tine holder 17A taper very gently towards their outer ends and each of those outer ends integrally supports a corresponding carrying sleeve 33 which is of substantially, although not exactly, oblong, rectangular external cross-section throughout its upright length. Each sleeve 33 has a bore 34 extending therethrough from top to bottom, said bore 34 being of a constant oblong rectangular cross-section throughout its upright length. The two carrying sleeves 33 are disposed in an identical manner and at the same distance from the longitudinal axis of the corresponding shaft 3, the bore 34 of each sleeve 33 receiving, in use, a corresponding tine 32 having the same cross-sectional shape as does the corresponding bore 34 and being a snug but readily slidable fit therein. It can be seen in FIGS. 6 and 7 of the drawings that the longer sides of the substantially oblong cross-section of each sleeve 33 are not tangential to a circle centered upon the axis of the corresponding shaft 3, each sleeve 33 being so disposed that its front, with respect to the intended direction of operative rotation B of the corresponding soil working member, is further from that axis than is the rear thereof. The front of each sleeve 33, relative to the direction B, is rounded and also merges by way of a smooth curve into the base of the leading cavity 21 of the limb of the holder 17A which supports said sleeve 33. With this arrangement, displaced soil collecting in each such cavity 21 can readily escape laterally around the front of the neighboring sleeve 33 under the action of centrifugal force and the displacing effect of further soil collecting in the cavity 21. This feature is particularly important when the soil working implement is set to operate at its maximum working depth under which circumstances the tine holders 17A will be very close to, if not actually penetrating into, the surface of the ground being cultivated. The steady displacement of crumbled soil through the leading cavities 21 avoids accumulations and sudden releases of quantities of crumbled soil and thus facilitates the production of a smooth seed bed without any power-wasting "drag and snatch" in the operation of the soil working members.

Figures 8, 9, 10:
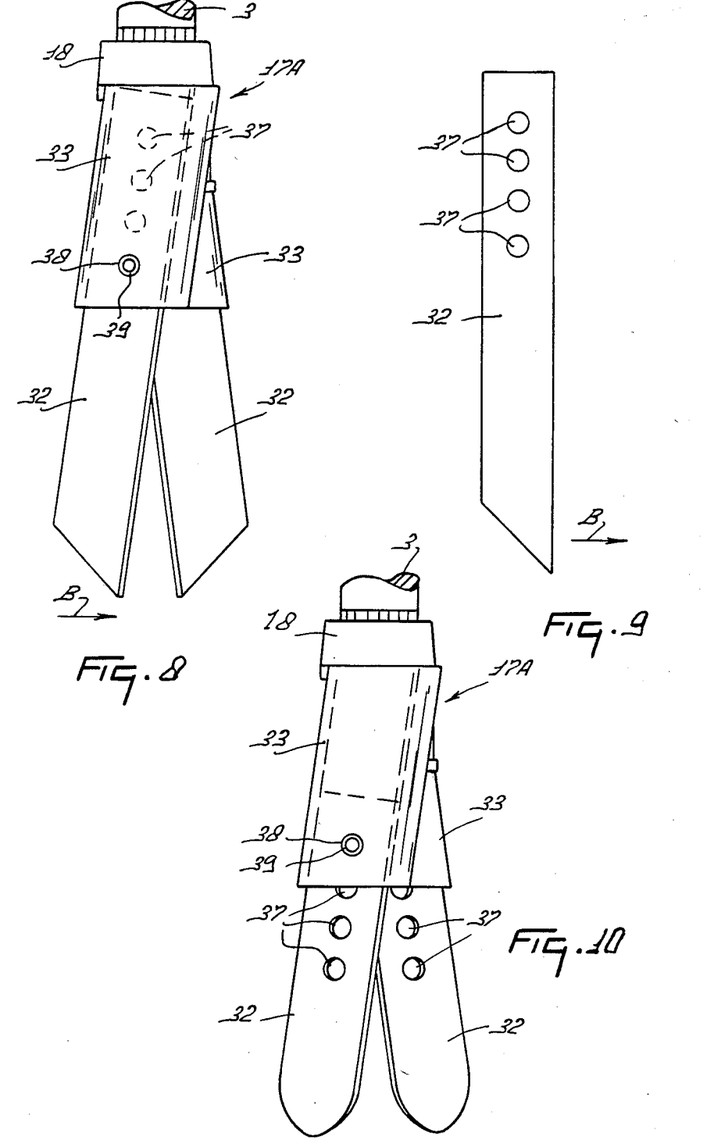
FIG. 8 is a view as seen in the direction indicated by an arrow VIII in FIG. 7.
FIG. 9 is a side elevation of a single unmounted tine of the embodiment of FIGS. 6 to 8 of the drawings, the tine of FIG. 9 being seen in a direction that is perpendicular to its length and to its general plane.
FIG. 10 is a similar view to FIG. 8 but illustrates worn tines that have three times been extended, said tines occupying their last working position prior to replacement.

It can be seen in FIG. 8 of the drawings that each carrying sleeve 33 has its longitudinal axis inclined to that of the corresponding shaft 3 so as to trail rearwardly with respect to the direction of rotation B of the corresponding soil working member at an angle whch may be of the order of substantially 10°. Naturally, since the rectilinear tines 32 are supported by the sleeves 33, those tines 32 will have the same inclinations of substantially 10° to the longitudinal axes of the corresponding shafts 3 as do the sleeves 33 themselves. Once again, the front of each sleeve 33, with respect to the direction of rotation B of the soil working member of which that sleeve forms a part, has a thickness 35 (FIG. 7) which is considerably greater than the thickness 36 of the sleeve at the rear thereof with respect to the direction B. As in the preceding embodiment, it is the front of each sleeve, with respect to the direction B, that receives the overwhelming majority of the abrasive wear and, with the off-center disposition of the bore 34 in each sleeve 33 that renders the front of the latter, relative to the direction B, much thicker than the rear thereof, the sleeves 33, and thus the tine holders 17A, will usually last for a long time before inevitable wear eventually renders the fronts of the sleeves 33 so thin that the tines 32 can no longer be reliable supported and replacement becomes necessary. As in the preceding embodiment, the arrangement which has just been described leads to optimum usage of the material from which the tine holders 17A and their sleeves 33 are formed.

Once again, the length of each sleeve 33 is not less than one-third of the total length of a new tine 32 so that each tine 32 is very reliably supported by its sleeve 33 even when the tine 32 has become very worn, after a long period of use, and has been downwardly displaced a plurality of times in its sleeve 33 to restore substantially the original extent of downward projection of the tine 32 from its sleeve 33 for the purpose that has already been discussed above. In this embodiment, each flat tine 32 is formed, towards its upper end, with a row of four regularly spaced apart transverse removed portions comprising gaps or holes 37 (FIG. 9) which holes are formed midway between the front and rear edges of the tine relative to the direction B. The broader walls of each sleeve 33 are formed, towards the lower ends thereof, with aligned transverse holes 38 and, as can be seen best in FIG. 8, each new tine 32 is first installed with the lowermost hole 37 therethrough in register with the lowest hole 38, a retaining pin or tube 39 being entered through the aligned holes 38, 37, 38 to keep the tine 32 in its appointed position of axial projection from the sleeve 33 concerned as long as may be required. If preferred, one edge of each tine 32 may be formed with a row of notches that are similar to the notch 29 described above with particular reference to FIG. 4 of the drawings and, in this case, the aligned holes 38 in each sleeve 33 will be formed close to either the front or the rear of that sleeve 33, relative to the direction B, depending upon the front or rear disposition of the notches 29. The retaining pin or tube 39 is then entered through the aligned holes 38 so as to intrude into the appropriate notch 29. Again, as in the first embodiment, new tines 32 may be of such a length that their upper ends project above the tops of the sleeves 33 into the space between the tops (excluding the hubs 18) of the tine holder 17A and the bottom of the hollow frame portion 2. This can still further increase the effective life of each tine 32 but will, of course, require at least one extra transverse hole 37 to be formed above the holes 37 that are shown in FIG. 9 to enable the extra length of each tine 32 to be correctly employed. It will be seen from FIG. 6 of the drawings that each sleeve 33 projects by marginally more than half its axial length beneath the bottom of the corresponding tine holder 17A so that, as in the case of the first embodiment, the downwardly projecting portion of each sleeve 33 can itself be considered as constituting an element that participates in the cultivation of the soil since it will penetrate into the ground whenever the implement is adjusted to operate at, or near, its maximum working depth.

It has previously been mentioned that, as can be seen best in FIG. 7, the larger surfaces of the sleeves 33 and the tines 32 which they carry are not tangentially disposed with respect to circles centered upon the corresponding axes of rotation, the soil-displacing effect of each tine 32 and its carrying sleeve 33 being greater than if a tangential disposition were to be adopted. The tines 32 and their carrying sleeves 33 tend to displace the soil inwardly towards the axis of rotation of each soil working member and thus towards imaginary substantially vertical planes that contain said axes of rotation and extend parallel to the direction A (FIG. 1). As a result, and considered in a horizontal direction that is substantially perpendicular to the direction A, the soil is crumbled with greater uniformity than would be the case if the broad side surfaces of the tines 32 and their carrying sleeves 33 were to extend strictly tangentially with respect to circles centered upon the longitudinal axes of the corresponding shafts 3. In the embodiment which is being described, a plane extending radially from the longitudinal axis of one of the shafts 3 intersects the outer broad side surface of one of the corresponding tines 32 at substantially the front of that tine, with respect to the direction B concerned, (or a line extending perpendicular to the plane at such intersection) at a preferred angle of substantially 22° which angle, however, may have any desired value between 15° and 30°, inclusive.

In each embodiment, the perpendicular distance between the lowermost ends or tips of the two tines of each rotary soil working member is substantially twenty-five centimeters, being the same, or marginally greater than, the distance between the longitudinal axes of immediately neighboring shafts 3. Also, in each embodiment, each tine 26 or 32, when new, has a length of not less than substantially twenty-five centimeters.

FIG. 10 illustrates two tines 32 of the second embodiment when approaching the end of their useful life, that is to say, when they have already been displaced downwardly in their carrying sleeves 33 so far that the uppermost holes 38 therein cooperate with the holes in the walls of the sleeves 33 and with the corresponding retaining pins or tubes 39, the lowermost ends of the tines 33 being rounded off due to the continuous shortening and blunting effect of the abrasive soil through which they have been rapidly rotated by power derived from the agricultural tractor or other operating vehicle shown in, for example, FIG. 1. However, a comparison between FIGS. 10 and 8 of the drawings will show that, even at this stage in the life of each tine 32, a sufficient length thereof remains surrounded by the corresponding sleeve 33 to ensure a substantially rigid and fully satisfactory support and that, because of the compensating adjustments which have been made during the lifetime of each tine 32, the effective length thereof remains substantially the same as in the case of the new and unworn tines 32 shown in FIG. 8.

Although certain features of the soil cultivating implement embodiments illustrated in the accompanying drawings will be set forth in the following claims as inventive features, it is emphasized the invention is not necessarily limited to those features and may include within its scope each of the parts of each soil cultivating implement embodiment that has been described or illustrated in the accompanying drawings or both, individually and in various combinations.

The soil cultivating implement embodiments that have been described also form the subject of our co-pending U.S. patent application Ser. No. 503,019, filed June 10, 1983, to which reference is directed. "Tine" is used broadly in the claims to include tines 26 and 32 and their equivalents and other earth working tools which penetrate into soil and are moved relative thereto in a manner similar to tines 26 and 32.

Having disclosed my invention, what I claim as novel and to be secured by Letters Patent of the United States is:

1. A soil working member which rotates about a substantially vertical axis to work the underlying soil, the soil working member comprising a tine holder for holding a tine at a distance spaced from its corresponding axis that penetrates a substantial distance into the soil while at the same time it is rotated about said axis, said tine holder comprising a substantially vertically disposed sleeve, said sleeve having a hollow interior for receiving said tine, said sleeve between its exterior and its hollow interior being thicker along its leading edge than along its trailing edge relative to its usual direction of rotation, said tine holder being substantially U- shaped when seen in vertical cross section, the limbs of the U being directed forwardly with respect to the intended direction of operative rotation of the soil working member of which said holder forms a part.

1. A soil working member which rotates about a substantially vertical axis to work the underlying soil, the soil working member comprising a tine holder for holding a tine at a distance spaced from its corresponding axis that penetrates a substantial distance into the soil while at the same time it is rotated about said axis, said tine holder comprising a substantially vertically disposed sleeve, said sleeve having a hollow interior for receiving said tine, said sleeve between its exterior and its hollow interior being thicker along its leading edge than along its trailing edge relative to its usual direction of rotation, said tine holder being substantially U-shaped when seen in vertical cross section, the limbs of the U being directed forwardly with respect to the intended direction of operative rotation of the soil working member of which said holder forms a part.

2. A soil working member which rotates about a substantially vertical axis to work the underlying soil, the soil working member comprising a tine holder for holding a tine at a distance spaced from its corresponding axis that penetrates a substantial distance into the soil while at the same time it is rotated about said axis, said tine holder comprising a substantially vertically disposed sleeve, said sleeve having a hollow interior for receiving said tine, said sleeve between its exterior and its hollow interior being thicker along its leading edge than along its trailing edge relative to its usual direction of rotation, said tine holder bending rearwardly with respect to the intended direction of operative rotation of the soil working member of which it forms a part and being substantially U-shaped when seen in vertical cross section, the limbs of the U being directed forwardly with respect to the intended direction of operative rotation of the soil working member of which said holder forms a part.

3. A soil working member which rotates about a substantially vertical axis to work underlying soil, the soil working member comprising a tine holder for holding a tine at a distance spaced from its corresponding axis that penetrates a substantial distance into the soil while at the same time it is rotated about said axis, said tine holder comprising a substantially vertically disposed sleeve, said sleeve having a hollow interior for receiving said tine, said sleeve between its exterior and its hollow interior being thicker along its leading edge than along its trailing edge relative to its usual direction of rotation, said tine holder being curved rearwardly relative to said direction and being substantially U-shaped when seen in vertical cross section, the limbs of the U extending forwardly with respect to the intended direction of operative rotation of the soil working member of which said holder forms a part.

4. A soil working member which rotates about a substantially vertical axis to work the underlying soil, a soil working member comprising a tine holder for holding a tine at a distance spaced from its corresponding axis that penetrates a substantial distance into the soil while at the same time it is rapidly rotated about said axis, said tine holder comprising a substantially vertically disposed sleeve, said sleeve having a hollow interior for receiving said tine, said hollow interior being arranged eccentrically with respect to the exterior thereof so that said sleeve between its exterior and its hollow interior is thicker along its leading edge than along its trailing edge relative to its usual direction of rotation, said tine holder being curved rearwardly with respect to the intended direction of operative rotation of the soil working member of which it forms a part, at least the front of said tine holder with respect to the intended direction of operative rotation of the soil working member of which it forms a part being formed with a substantially horizontally extending cavity which extends from the axis of rotation of the soil working member towards said sleeve, said tine holder defining said cavity by being substantially U-shaped when seen in vertical cross section, the limbs of the U projecting forwardly with respect to the intended direction of operative rotation of the soil working member of which said holder forms a part.

5. A soil working member as claimed in claim 4 wherein said tine holder's hollow interior comprises a substantially vertical bore through said sleeve, a tine of uniform horizontal cross section received in said bore, the shape of said bore and said tine being such that said tine is snuggly received in said bore and at the same time unless otherwise secured is slideable relative to said bore along the bore's longitudinal axis, the soil working member further comprising securing means for rigidly securing said tine in at least one selected fixed position in said bore.

6. A soil working member in accordance with claim 5 wherein said securing means, said sleeve and said tine are so arranged and constructed that said tine can be retained in one of at least two different selected fixed positions of projection from said sleeve.

7. A soil working member in accordance with claim 6 wherein said tine's uniform horizontal cross section is substantially square and so disposed that a plane through opposite corners of said square nearest to and farthest from said axis respectively substantially coincides with said axis.

8. A soil working member in accordance with claim 7 wherein the lowermost soil-engaging end of said tine has, when new, a point located eccentrically with respect to said tine's longitudinal axis, said point being located at the leading edge of said tine with respect to the intended direction of operative rotation of the soil working member in which it is operatively mounted.

9. A soil working member in accordance with claim 8 wherein said sleeve of said tine holder has a plurality of means for receiving a retaining member for securing said tine thereto, oone edge of said tine being formed with a removed portion for cooperation with said retaining member enabling said tine to be releasably secured in a plurality of selected positions in said sleeve.

10. A soil working member in accordance with claim 4 wherein the length of said sleeve is at least one-third the length of said tine.

* * * * *